United States Patent
Vaughn et al.

(10) Patent No.: US 9,832,601 B1
(45) Date of Patent: Nov. 28, 2017

(54) PAIRING AND ATTESTATION OF PROXIMAL DEVICES

(71) Applicant: Intel Corporation, Santa Clara, CA (US)

(72) Inventors: Robert Lawson Vaughn, Portland, OR (US); Vishwa Hassan, Chandler, AZ (US); Aziz M. Safa, Phoenix, AZ (US); Akshay Chandrasekhar, Bangalore (IN); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/198,168

(22) Filed: Jun. 30, 2016

(51) Int. Cl.
*H04B 5/00* (2006.01)
*H04B 7/00* (2006.01)
*H04W 4/00* (2009.01)
*H04W 76/02* (2009.01)
*H04W 12/04* (2009.01)
*H04W 4/02* (2009.01)
*H04W 84/04* (2009.01)

(52) U.S. Cl.
CPC .......... *H04W 4/008* (2013.01); *H04W 12/04* (2013.01); *H04W 76/023* (2013.01); *H04W 4/023* (2013.01); *H04W 4/028* (2013.01); *H04W 84/042* (2013.01)

(58) Field of Classification Search
CPC ................................................... H04W 4/008
USPC ............................................... 455/41.1, 41.2
See application file for complete search history.

(56) References Cited

U.S. PATENT DOCUMENTS

| | | | |
|---|---|---|---|
| 9,654,904 B2 * | 5/2017 | Tredoux | H04W 4/008 |
| 2007/0124789 A1 * | 5/2007 | Sachson | G06Q 30/00 |
| | | | 725/117 |
| 2013/0005347 A1 * | 1/2013 | Curticapean | H04W 64/00 |
| | | | 455/456.1 |
| 2015/0154452 A1 * | 6/2015 | Bentley | G06K 9/00711 |
| | | | 386/201 |
| 2015/0318874 A1 * | 11/2015 | Donaldson | H04B 11/00 |
| | | | 367/135 |

* cited by examiner

*Primary Examiner* — Tilahun B Gesesse
(74) *Attorney, Agent, or Firm* — Schwegman Lundberg & Woessner, P.A.

(57) ABSTRACT

A host device to pair with a modular device includes an environmental data collection system to provide motion data, and a data analysis circuit to filter the motion data to provide motion information. The data analysis circuit further to detect anomalies in the motion data to provide anomaly data. The host device further including a pairing system to determine whether the host device is proximate to the modulate device based on a comparison of the motion information with received motion information from the modular device. The pairing circuit is further to pair with the modular device responsive to a match between a key and a received key from the modular device. The host device further including a key generator to generate the key based on a comparison between the anomaly data and received anomaly data from the modular device responsive to a determination that the modular device is proximate.

22 Claims, 6 Drawing Sheets

PAIRING AND ATTESTATION OF PROXIMAL DEVICES

BACKGROUND

As wearable systems become more popular, wearable devices may include a capability to allow users to "plug in" "modules" to extend functionality. Modules may include designs or things that allow a user to plug in additional computing systems as they wish. For example, a compute module may include functionality for GPS, temperature, radio (e.g., AM/FM), projection (e.g., pico or LCD), etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain details are set forth below to provide a sufficient understanding of embodiments of the disclosure. However, it will be clear to one skilled in the art that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

Examples of wearable systems described herein may enable pairing and attestation of proximal modular compute devices. Host devices that include the capability to plug-in modular compute devices to extend functionality often have to balance between providing protections to ensure security of connection to the host and modular compute device and ease-of-use. In some examples, piconet (e.g., Bluetooth) compute devices may have two trust levels available: (1) open to all and (2) explicitly trusted by user action. Additionally, an alternate method may be developed that allows for a trusted connection without user interaction. For example, a method to trust two or more compute devices without interaction from the user to facilitate pairing using environmental data, such as movement, location, temperature, light, sound, humidity, or combinations thereof. Thus, the method may include both algorithmic-based designs and standards based designs. In summary: 1) allow for compute modules to be added to wearable networks, 2) allow for compute modules to extend functionality through small computers that serve a special purpose such as GPS, AM/FM radio, temperature sensing, software functionality, or combinations thereof.

Figure 1:
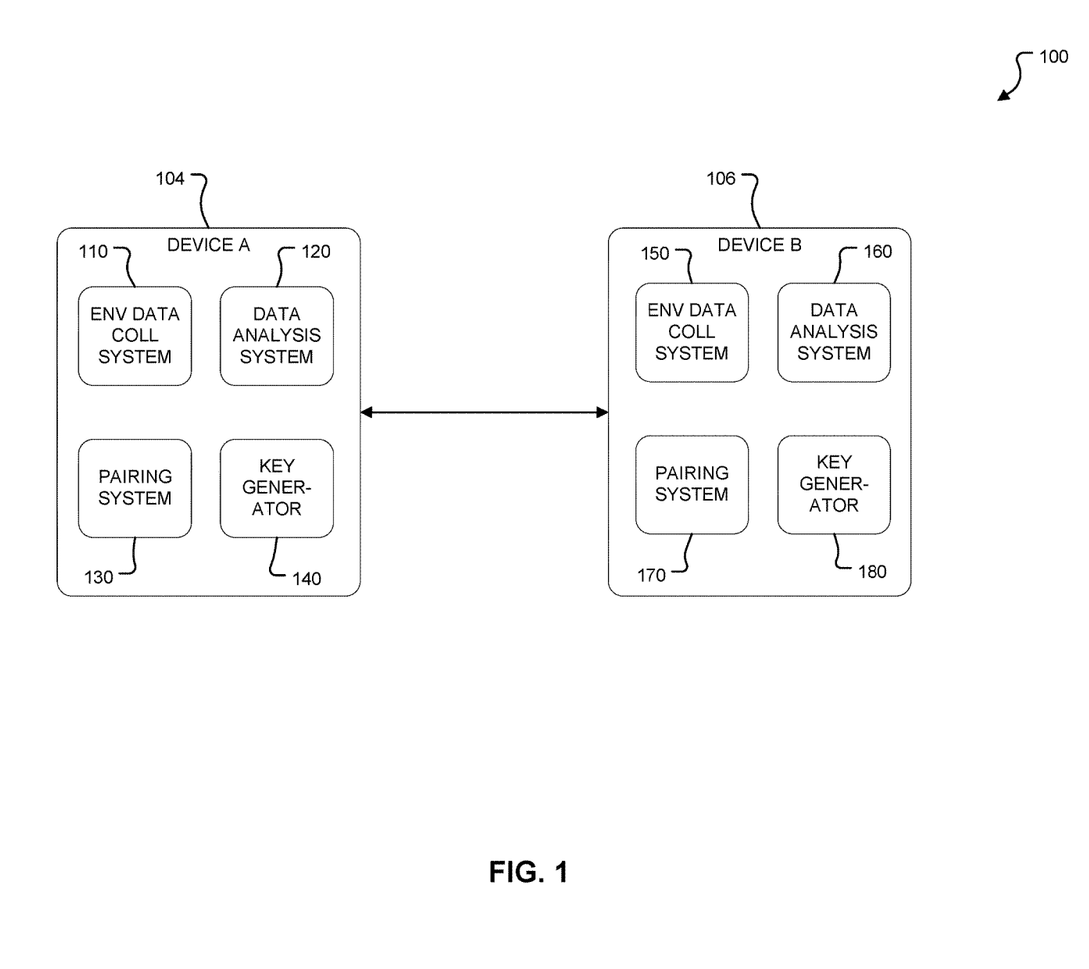
FIG. 1 illustrates a wearable system to pair a host device with a modular device using environmental data in accordance with some embodiments.

FIG. 1 illustrates a wearable system (system) 100 to pair a host device with a modular device using environmental data according to an embodiment of the disclosure. The system 100 may facilitate pairing of a device A 104 (e.g., host device) to a device B 106 (e.g., modular device) using environmental factors to determine proximity. The device A 104 may include a communications module, a smart phone, a smart watch, a computing device, or any other wearable or portable device capable of communicating with another device wirelessly. The device B 106 may include a module, a communications device, a smart phone, a smart watch, a computing device, or any other wearable or portable device capable of communicating with another device wirelessly.

The device A 104 may include an environmental data collection system 110, a data analysis system 120, a pairing system 130, and a key generator 140. The environmental data collection system 110 may include modules, sensors, circuits, or combinations thereof that sense environmental data associated with environmental conditions, such as motion, temperature, location, light, humidity, or other environmental conditions. The environmental data collection system 110 may provide the sensed environmental data (e.g., temperature, motion, audio, light, humidity, location, etc.) to the data analysis system 120 and/or the pairing system 130. The data analysis system 120 may process the sensed environmental data to provide environmental information for use by the key generator 140 and by the pairing system 130. In some examples, the data analysis system 120 may include circuits, modules, or devices that filter motion data to remove anomalies from the environmental data or to isolate anomalies in the environmental data.

The pairing system 130 may include a transceiver that wirelessly communicates with the device B 106. The wireless communication may include near-field communication (NFC), a piconet (e.g., Bluetooth), or a network (e.g., local area networks (LANs), or cellular networks. Communication over the network may use any communication protocol, including, but not limited to, ISO/IEC temperature sensor 21481/ECMA-352 or other NFC standard, Bluetooth, TCP/IP, UDP, and IEEE 802.11, Long-Term Evolution (LTE) or LTE advanced wireless communication, or any other cellular/wireless communication standard. The pairing system 130 may include modules, software, or circuitry configured to communicate and pair with the device B 106 based on the processed data from the data analysis system 120 and on sensed data received from the device B 106. As part of the pairing process, the pairing system 130 may receive the environmental information and keys (e.g., pins) from the device B 106.

The key generator 140 may include a module, device, or circuit configured to receive processed data from the data analysis system 120, and to generate a key (e.g., pin) based on the processed data. In some examples the processed key may be generated based on anomaly data provided by the data analysis system 120.

The device B 106 may include an environmental data collection system 150, a data analysis system 160, a pairing system 170, and a key generator 180. The environmental data collection system 150 may include modules, sensors, circuits, or combinations thereof that sense environmental data associated with environmental conditions, such as motion, temperature, location, light, humidity, or other environmental conditions. The environmental data collection system 150 may provide the sensed environmental data (e.g., temperature, motion, audio, light, humidity, location, etc.) to the data analysis system 160 and/or the pairing system 170. The data analysis system 160 may process the sensed data to provide environmental information for use by the key generator 180 and by the pairing system 170. In some examples, the data analysis system 160 may include circuits, modules, or devices that filter motion data to remove anomalies from the environmental data or to isolate anomalies in the environmental data.

The pairing system 170 may include a transceiver that wirelessly communicates with the device B 106. The wireless communication may include near-field communication (NFC), a piconet (e.g., Bluetooth), or a network (e.g., local area networks (LANs), or cellular networks. Communication over the network may use any communication protocol, including, but not limited to, ISO/IEC temperature sensor 21481/ECMA-352 or other NFC standard Bluetooth, TCP/IP, UDP, and IEEE 802.11, Long-Term Evolution (LTE) or LTE advanced wireless communication, or any other cellular/wireless communication standard. The pairing system 170 may include modules, software, or circuitry configured to communicate and pair with the device B 106 based on the processed data from the data analysis system 160 and on sensed data received from the device B 106. As part of the pairing process, the pairing system 170 may receive processed data and keys (e.g., pins) from the device B 106.

The key generator 180 may include a module, device, or circuit to receive processed data from the data analysis system 160, and to generate a key (e.g., pin) based on the processed data. In some examples the processed key may be generated based on anomaly data provided by the data analysis system 160.

In operation, the device A 104 and the device B 106 may be paired to extend functionality of one or both of the device A 104 and the device B 106. That is, the device A 104 and/or the device B 106, once paired, may leverage capabilities of each other to extend capabilities of the device A 104 and/or the device B 106 existing functionality. For example, the device B 106 may be a GPS module that is capable of adding GPS functionality to the device A 104. A pairing process between the device A 104 and the device B 106 may be initiated without input from a user, in some examples. When the device A 104 and the device B 106 are proximate to one another, one or both of the device A 104 and device B 106 may initiate a pairing process. Because pairing two devices may pose a security risk to one device or the other, the pairing process between the device A 104 and the device B 106 may include use of environmental data to determine whether the devices are proximate to and interact with each other in such a way that indicates pairing the devices is safe. For example, proximity may be indicated when the temperature or humidity is the same, when the location proximate, when NFC is accessible, when individual motion of the device A 104 and device B 106 indicates some level of coordination, or combinations thereof.

The pairing system 130 of the device A 104 may communicate with the pairing system 170 of the device B 106 to initiate a pairing process. The pairing system 130 and the pairing system 170 may each include transceivers capable of providing and receiving data wirelessly. Responsive to initiation of the pairing process, the environmental data collection system 110 and the environmental data collection system 150 of the device A 104 and the device B 106, respectively, may collect and/or retrieve respective environmental data. The collected/retrieved environmental data may include temperature data, humidity data, motion data, location data, or combinations thereof. The pairing system 130 and the pairing system 170 may also attempt to communicate using NFC, which may be used as a factor to indicate proximity.

The data analysis system 120 and the data analysis system 160 may respectively extract environmental information and respectively anomaly information from the data. The pairing system 130 may provide the environmental information from the data analysis system 120 of the device A 104 to the pairing system 170, and the pairing system 170 may provide environmental information from the data analysis system 160 of the device B 106 to the pairing system 130. Responsive to the pairing system 130 detecting that the device B 106 is proximate to the device A 104 based on a comparison between the environmental information from the data analysis system 120 and the received environmental information, the pairing system 130 may send the respective anomaly information to the device B 106. Responsive to the pairing system 170 detecting that the device A 104 is proximate to the device B 106 based on a comparison between the environmental information from the data analysis system 160 and the received environmental information, the pairing system 170 may send the respective anomaly information to the device A 104. In another example, only the device A 104 may compare the data to determine a proximity indication, and if proximity is determined, may provide the respective anomaly information from the data analysis system 120 and may request the anomaly information from the device B 106.

Generally, the environmental data may be generated by applying a smoothing function to environmental information from each of the device A 104 and the device B 106 to remove outlier (e.g., anomaly) data. This generates two templates (e.g., a reference template and a comparing template. Application of the smoothing function may improve correlation when comparing the reference template and the comparison template data from the two independent sensors, and thus may improve matching between the data sets.

The goal of harvesting the anomaly data is to identify randomly occurring exceptions that fall outside of the smoothing function's corrective behavior relative to what is found in the reference template. For example, the anomaly data may include outlier data that exceeds a certain magnitude threshold. For use in key generation, the anomaly data may be in the form of a binary number that includes all samples of the environmental information exceeding a defined threshold tagged with a first value (e.g., a logical "1" value), and all other samples tagged with a second value (e.g., a logical "0" value). This may create a binary map that can be compared between the two data sets without requiring that the raw environmental information values match exactly. The harvested anomaly data may be used to generate a key that is specific to a particular pairing process. It would not be likely that the same set of anomalies would appear in a subsequent pairing process.

The comparison of the environmental data may be looking for a match in some examples. In other examples, the comparison may be based on an anticipated or possible relationship between the device A 104 and the device B 106. For example, when using motion data, if the device A 104 is a watch on one arm of a user and the device B 106 is a bracelet on the other arm of the user, the motion data may be reciprocal data in one direction as the user is walking.

The key generator 140 may generate a first key based on the anomaly information from the data analysis system 120 and the received anomaly information from the device B 106, and the key generator 180 may generate a second key based on the anomaly information from the data analysis system 160 and the received anomaly information from the device A 104. The pairing system 170 may provide the second key to the device A 104. The pairing system 130 may compare the first key to the second key to determine whether the device A 104 and the device B 106 are safe for pairing and sharing of information. The comparison may detect a complete match, or may detect a match that exceeds a threshold percentage. The pairing process may use both the environmental information and the anomaly information because, while a comparison of the environmental information may indicate proximity, this type of data may easily be replicated. The anomaly data may provide an additional level of security that relies on anomalies in collected environmental data occurring similarly to two proximate devices.

In a specific example, the pairing system 130 and the pairing system 170 may have one or more accelerometers or gyroscopes that are capable of detecting respective motion data for the device A 104 and the device B 106, respectively. The detected motion data may be provided to the data analysis system 120 and the data analysis system 160, respectively. The data analysis system 120 may extract first motion information (e.g., information that indicates the nature of the motion) and first anomaly information (e.g., spurious information not generally associated with the nature of the motion). The data analysis system 160 may extract second motion information and second anomaly information. The pairing system 130 may provide the first motion information to the device B 106 and the pairing system 170 may provide the second motion information to the device A 104. The pairing system 130 may compare the first motion information to the second motion information to determine whether the device A 104 is proximate to the device B 106. Likewise, the pairing system 170 may compare the first motion information to the second motion information to determine whether the device B 106 is proximate to the device A 104. Proximity may be determined based on similar motion (e.g., two devices connected to the same arm of a wearer walking), reciprocal motion (e.g., one device on each arm of a wearer walking), or other motions that indicates proximity (e.g., handshake, high five, etc.). Responsive to the pairing system 130 detecting that the device B 106 is proximate to the device A 104, the pairing system 130 may send the respective first anomaly information to the device B 106. Responsive to the pairing system 170 detecting that the device A 104 is proximate to the device B 106, the pairing system 170 may send the second anomaly information to the device A 104. In another example, only the device A 104 may compare the motion information to determine a proximity indication, and if proximity is determined, may provide the respective anomaly information from the data analysis system 120 and may request the anomaly information from the device B 106. The anomaly information may be compared by each of the key generator 140 and key generator 180 to generate keys, which may be exchanged to being a pairing process and determine if communication between the devices is safe.

Examples of the device A 104 and the device B 106 may include a watch (or ring) with different, separate, computing components, a purse and bracelet, a watch and a smartphone, a bracelet and a watch, a full body hazmat suit with attached computing devices. Using the environmental data to determine proximity without input from user may provide a more secure system that opens pairing and may have greater ease-of-use as compared with a system that requires user input (e.g., a secret code).

Figure 2:
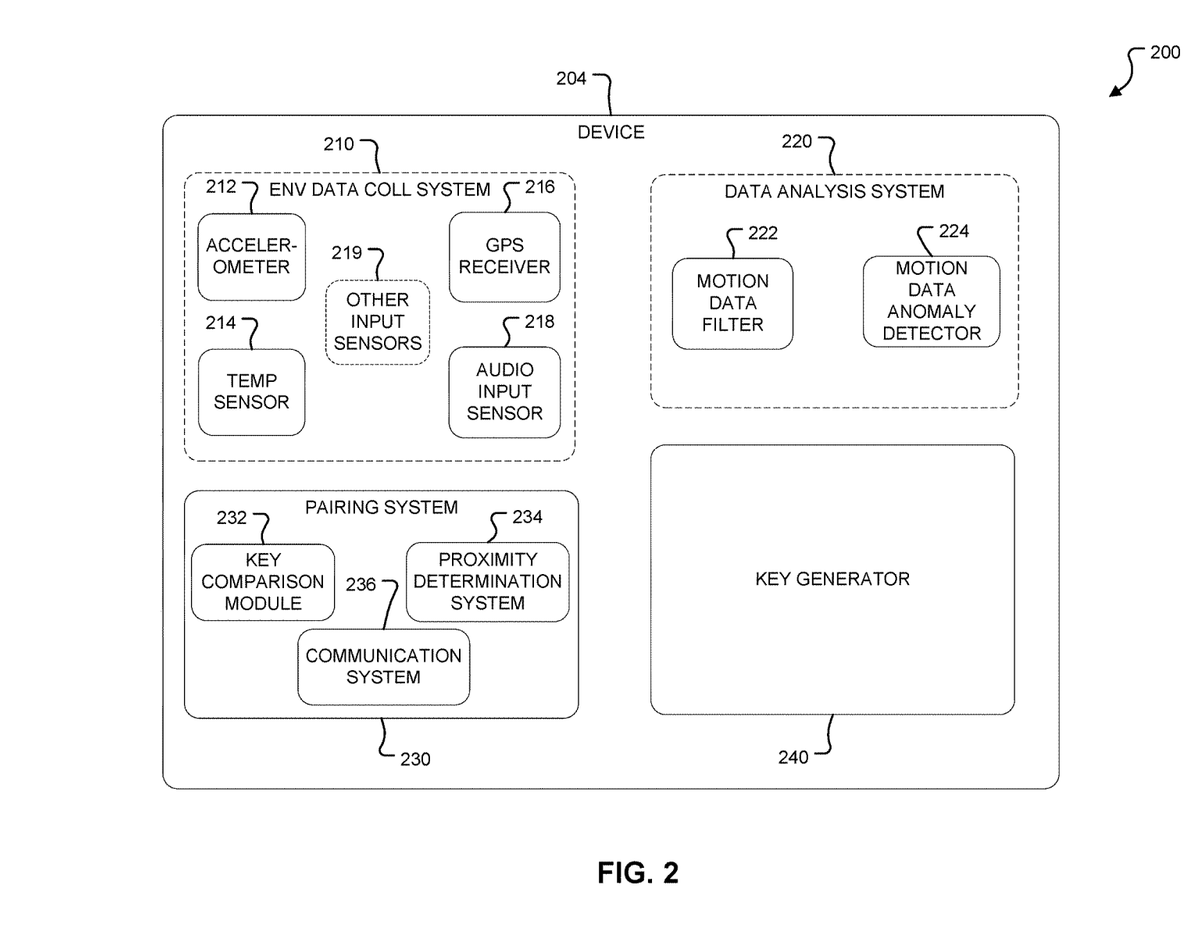
FIG. 2 illustrates a wearable system to pair a host device with a modular device using environmental data in accordance with some embodiments.

FIG. 2 illustrates a wearable system (system) 200 including a device 204 according to an embodiment of the disclosure. The device 204 may facilitate pairing to another computing device (not shown) using environmental factors to determine proximity. The device 204 may include a communications module, a smart phone, a smart watch, a computing device, or any other wearable or portable device capable of communicating with another device wirelessly. In some examples, the device 204 may be implemented in the device A 104 of FIG. 1, the device B 106 of FIG. 1, or combinations thereof.

The device 204 may include an environmental data collection system 210, a data analysis system 220, a pairing system 230, and a key generator 240. The environmental data collection system 210 may include modules, sensors, circuits, or combinations thereof that sense environmental data associated with environmental conditions, such as an accelerometer 212, a temperature sensor 214, a GPS receiver 216, an audio input sensor 218, or other input sensors 219. The environmental data collection system 210 may provide the sensed environmental data (e.g., temperature, motion, audio, light, humidity, location, etc.) to the data analysis system 220 and/or the pairing system 230. The data analysis system 220 may process the sensed environmental data to provide environmental information for use by the key generator 240 and by the pairing system 230. In a specific example, the data analysis system 220 may include a motion data filter 222 and a motion data anomaly detector 224. The motion data filter 222 may filter motion data received from the accelerometer 212 to remove anomalies from the information and provide motion information. The motion data anomaly detector 224 may detect anomalies in the motion data to provide anomaly information. The motion information and the anomaly information may be used in a pairing process with another computing device. In some examples, the motion data filter 222 and the motion data anomaly detector 224 may include circuits, modules, or devices that filter the motion data to remove anomalies from the motion data or to isolate anomalies in the motion data, respectively.

The pairing system 230 may facilitate a paring process with another computing device based on environmental data comparisons. The pairing system 230 may include a key comparison module 232, a proximity determination system 234, and a communication system 236. The communication system 236 may include a transceiver that wirelessly communicates with other computing devices. The wireless communication may include near-field communication (NFC), a piconet (e.g., Bluetooth), or a network (e.g., local area networks (LANs), or cellular networks. Communication over the network may use any communication protocol, including, but not limited to, ISO/IEC temperature sensor 21481/ECMA-352 or other NFC standard Bluetooth, TCP/IP, UDP, and IEEE 802.11, Long-Term Evolution (LTE) or LTE advanced wireless communication, or any other cellular/wireless communication standard. The communication system 236 may include modules, software, or circuitry configured to communicate and pair with the other computing device based on the processed data from the data analysis system 220 and on sensed data received from the other computing device. The key comparison module 232 may include circuits, modules, or devices that compare a key generated by the key generator 240 with a key received from another computing device. The proximity determination system 234 may include circuits, modules, or devices that determine proximity based on a comparison of environmental information received from the data analysis system 220 with environmental information received from another computing device. As part of the pairing process, the pairing system 230 may receive processed data and keys from the 206. In some examples, the functionality of the key comparison module 232 and the proximity determination system 234 may be performed by the other computing device.

The key generator 240 may include a module, device, or circuit configured to receive processed data from the data analysis system 220, and to generate a key (e.g., pin) based on the processed data. In some examples, the processed key may be generated based on anomaly data provided by the data analysis system 220.

In operation, the device 204 may pair with the other computing device to extend functionality of one or both of the device 204. That is, once paired, the device 204 may leverage capabilities of the other computing device to extend capabilities of the existing functionality of the device 204. For example, the other computing device may be a GPS module that is capable of adding GPS functionality to the device 204. A pairing process between the device 204 and the other computing device may be initiated without input from a user, in some examples. When the device 204 is proximate to the other computing device, the device 204 may initiate a pairing process. Because pairing two devices may pose a security risk to one device or the other, the pairing process may include use of environmental data to determine whether the devices are proximate to and interact with each other in such a way that indicates pairing the devices is safe. For example, proximity may be indicated when the temperature or humidity is the same, when the location proximate, when NFC is accessible, when individual motion information indicates some level of coordination, or combinations thereof.

The environmental data collection system 210 may sense environmental data that is used to determine proximity. The accelerometer 212 may detect motion data, the temperature sensor 214 may detect temperature and/or humidity data, the GPS receiver 216 may detect location data, the audio input sensor 218 may detect audio data. The environmental data collection system 210 may include the other input sensors 219 that collects other environmental data.

The data analysis system 220 may receive the environmental data for processing to retrieve environmental information. The environmental information may be provided to the pairing system 230 for use in determining proximity to the other device. In a specific example, the motion data filter 222 may filter motion data received from the accelerometer 212 to remove anomalies from the information and provide motion information, and the motion data anomaly detector 224 may detect anomalies in the motion data to provide anomaly information.

The communication system 236 may communicate with the other computing device to initiate a pairing process. The communication system 236 may include a transceiver capable of providing and receiving data wirelessly. As part of the pairing process, the communication system 236 may provide environmental information from the data analysis system 220 to the other computing device, and may receive environmental information from the other computing device. The communication system 236 may also attempt to communicate using NFC, which may be used as a factor to indicate proximity.

The proximity determination system 234 may determine proximity based on a comparison between the environmental information from the data analysis system 220 and environmental information from the other computing device. For example, the proximity determination system 234 may compare motion information from the motion data filter 222 with motion information from the other computing device. Responsive to the proximity determination system 234 detecting proximity to the other computing device, the communication system 236 may send the anomaly information to the other computing device. The communication system 236 may also receive anomaly information from the other computing device. The comparison of the environmental information may be looking for a match in some examples. In other examples, the comparison may be based on an anticipated or possible relationship between the device 204 and the other computing device. For example, when using motion information, if the device 204 may be a watch on one arm of a user and the other computing device may be a bracelet on the other arm of the user, the motion information may be reciprocal motion data in one direction as the user is walking. Thus, proximity may be determined based on similar motion (e.g., two devices connected to the same arm of a wearer walking), reciprocal motion (e.g., one device on each arm of a wearer walking), or other motions that indicates proximity (e.g., handshake, high five, etc.).

The key generator 240 may generate a first key based on the anomaly information from the motion data anomaly detector 224 and the received anomaly information from the other computing device. The communication system 236 may receive a second key from the other computing device. The key comparison module 232 may compare the first key to the second key to determine whether the device 204 and the other computing device are safe for pairing and sharing of information. The comparison may detect a complete match, or may detect a match that exceeds a threshold percentage. The pairing process may use both the environmental information and the anomaly information because, while a comparison of the environmental information may indicate proximity, this type of data may easily be replicated. The anomaly data may provide an additional level of security that relies on anomalies in collected environmental data occurring similarly to two proximate devices.

Examples of the device 204 may include a watch (or ring) with different, separate, computing components, a purse and bracelet, a watch and a smartphone, a bracelet and a watch, a full body hazmat suit with attached computing devices. Using the environmental data to determine proximity without input from user may provide a more secure system that open pairing and may have greater ease-of-use as compared with a system that requires user input (e.g., a secret code).

Figure 3:
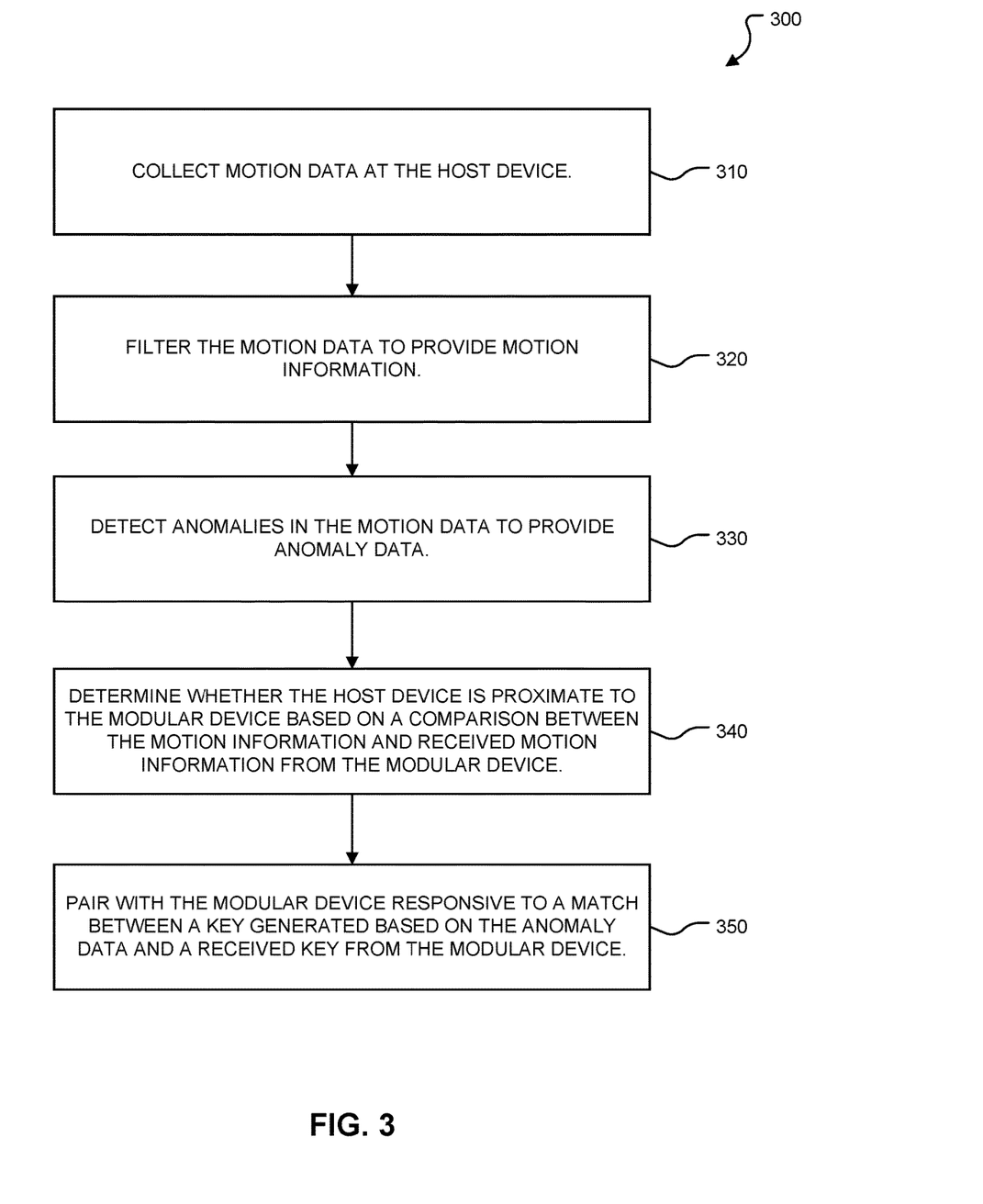
FIG. 3 illustrates a flow diagram of a method to initiate pairing of a host device and a modular device based on motion data in accordance with some embodiments.

FIG. 3 illustrates a flow diagram of a method 300 to initiate pairing of a host device and a modular device based on motion data in accordance with some embodiments. The method 300 may be implemented in the device A 104 and/or the device B 106 of FIG. 1, the device 204 of FIG. 2, or combinations thereof. For example, the host device may be implemented in the device A 104 of FIG. 1 and the modular device may be implemented in the device B 106 of FIG. 1.

The method 300 may include collecting motion data at the host device, at 310. Collection of the motion data may be via the environmental data collection system 110 and/or the environmental data collection system 150 of FIG. 1, the accelerometer 212 of FIG. 2, or combinations thereof. In some examples, other data, such as location data (e.g., via a GPS receiver such as the GPS receiver 216 of FIG. 2), audio data, (e.g., via an audio input sensor such as the audio input sensor 218 of FIG. 2), temperature data (e.g., via temperature sensor such as the temperature sensor 214 of FIG. 2), or other data (e.g., via a sensor such as the other input sensors 219 of FIG. 2), may be collected.

The method 300 may include filtering the motion data to provide motion information, at 320. Filtering of the motion data may be via the data analysis system 120 and/or the data analysis system 160 of FIG. 1, the motion data filter 222 of FIG. 2, or combinations thereof. In some examples, filtering the motion data to provide motion information may include removing anomalies from the motion data.

The method 300 may further include detecting anomalies in the motion data to provide anomaly data, at 330. Detection of the anomaly data may be via the data analysis system 120 and/or the data analysis system 160 of FIG. 1, the motion data anomaly detector 224 of FIG. 2, or combinations thereof.

The method 300 may further include determining whether the host device is proximate to the modular device based on a comparison between the motion information and received motion information from the modular device, at 340. Determination of whether the host device is proximate to the modular device may be via the pairing system 130 and/or the pairing system 170 of FIG. 1, the proximity determination system 234 of FIG. 2, or combinations thereof. In some examples, the method 300 may further include comparing the motion information with the received motion information from the modular device to detect a matching pattern. The matching pattern may include one of similar motion or reciprocal motion. In some examples, proximity may be further determined based on comparisons of other environmental data, such as temperature, audio, location, etc., data.

The method 300 may further include generating the key based on a comparison between the anomaly data and received anomaly data from the modular device responsive to a determination that the modular device is proximate. In some examples, determination of whether the modular device is proximate is further based the location data, audio data, temperature data, or combinations thereof. Generation of the key may be implemented in the key generator 140 and/or the key generator 180 of FIG. 1, the key generator 240 of FIG. 2, or combinations thereof.

The method 300 may further include pairing with the modular device responsive to a match between the key and a received key from the modular device, at 350. Pairing with the modulate device may be via the pairing system 130 and/or the pairing system 170 of FIG. 1, the pairing system 230 of FIG. 2, or combinations thereof. The match may be determined by comparing the key with the received key. In some examples, a match may be detected when the key matches the received key exactly. In other examples, a match may be detected when a threshold count of data points match between the key matches and the received key. The method 300 may further include blocking reception of communication the modular device responsive to failure to find a match between the key and the received key from the modular device, in some examples. The method may further include blocking reception of communication the modular device responsive to failure to detect that the modular device is proximate based on a comparison between the motion information and the received motion information from the modular device.

In some examples, the method 300 may include providing the motion information and anomaly data to the modular device; and receiving the received motion information and the received anomaly data from the modular device. The modular device may determine proximity with the host device based on the motion information and may generate the received key based on the anomaly data.

Figure 4:
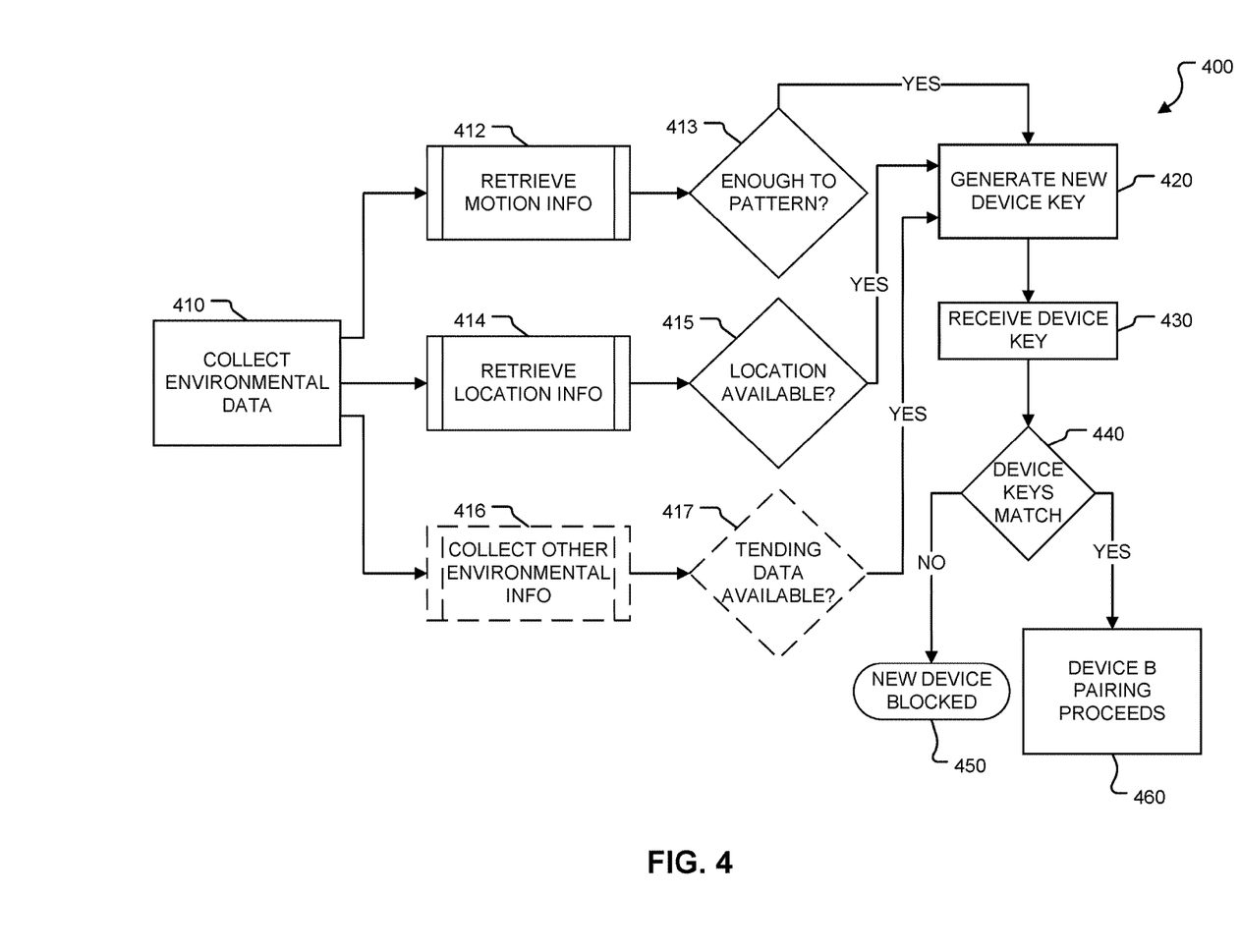
FIG. 4 illustrates a flow diagram of a method to initiate pairing of two devices based on collected environmental data in accordance with some embodiments.

FIG. 4 illustrates a flow diagram of a method 400 to initiate pairing of two devices based on collected environmental data in accordance with some embodiments. The method 400 may be implemented in the device A 104 and/or the device B 106 of FIG. 1, the device 204 of FIG. 2, or combinations thereof.

The method 400 may include collecting environmental data, at 410. Collection of the environmental data may be via the environmental data collection system 110 and/or the environmental data collection system 150 of FIG. 1, the 250 of FIG. 2. For example, an accelerometer (e.g., the accelerometer 212 of FIG. 2) may be used to collect motion data or a GPS receiver (e.g., the GPS receiver 216 of FIG. 2) may be use to collect location data, or other sensors (e.g., the temperature sensor 214 or the audio input sensor 218) may be used to collect other environmental data.

The method 400 may include collecting motion information, location information, and other information from the environmental, at 412, 414, and 416. For example, the motion information may be filtered from the motion data included in the environmental information.

The method 400 may further include determining whether enough information exists to generate a key. For example, the method 400 may include determining whether enough motion information is available to detect a pattern, at 413. For example, a particular amount of motion data may be required to exceed a threshold to be considered or a pattern match with another device's motion information may have to exceed a threshold to be considered. The method 400 may further include determining whether location information is available, at 415. In some examples, generation of the key may be further dependent on whether other trending data is available, such as temperature or audio information, at 417. The method 400 may include generating a key if enough motion information is available to generate a pattern and location data is available, at 420. In some examples, generating the key may be further based on whether other trending data is available, at 417. Generation of the key may be implemented in the key generator 140 and/or the key generator 180 of FIG. 1, the key generator 240 of FIG. 2, or combinations thereof. In some examples, the method 400 may further include detecting a pattern between the motion information and motion information for another computing device (e.g., device B) prior to generating a key.

The method 400 may further include receiving a device key from device B (e.g., the device B 106 of FIG. 1), at 530. The method 400 may further include comparing the generated key with the received key, 440. The comparison of keys may be implemented in the pairing system 130 and/or the pairing system 170 of FIG. 1, the key comparison module 232 of FIG. 2, or combinations thereof. If the keys match, the method 400 may further include pairing with device B, at 450. If the keys do not match, the method 400 may further include blocking reception of communication from device B, at 460. As compared with open pairing, using motion information as a factor when determining whether to pair with another device may improve security without requiring input from a user.

Figure 5:
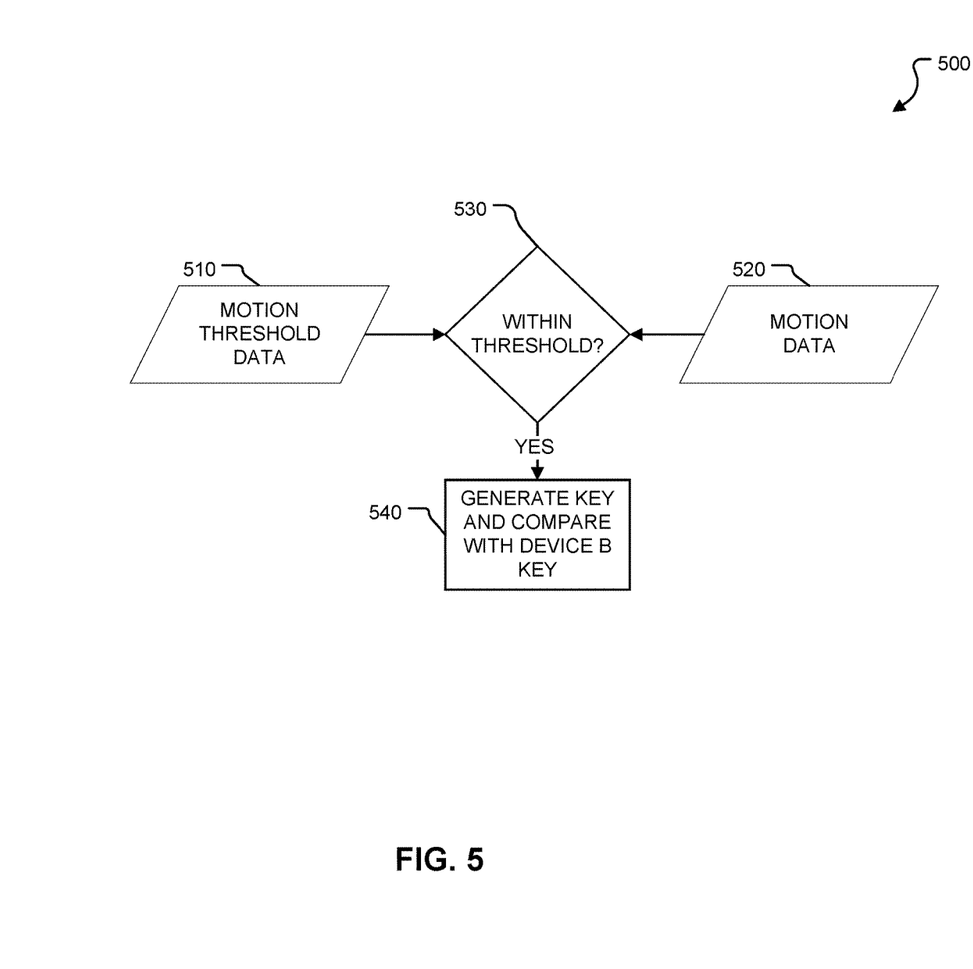
FIG. 5 illustrates a flow diagram of a method to determine whether to generate a key based on comparison of motion data with another device prior to pairing of two devices based on collected environmental data in accordance with some embodiments.

FIG. 5 illustrates a flow diagram of a method 500 to determine whether to generate a key based on comparison of motion data with another device prior to pairing of two devices based on collected environmental data in accordance with some embodiments. The method 500 may be implemented in the device A 104 and/or the device B 106 of FIG. 1, the device 204 of FIG. 2, or combinations thereof.

The method 500 may include comparing motion threshold data 510 with motion data 520. If a pattern is detected between the motion threshold data 510 and the motion data 520, at 530, the method 500 may further generating a key and comparing the key with a device B key, at 540. The motion threshold data may be generated by data analysis system or a motion data filter, such as the data analysis system 120 and/or the environmental data collection system 150 of FIG. 1, the motion data filter 222 of FIG. 2, or combinations thereof. The motion data may be received from device B via the pairing system 130 and/or the pairing system 170 of FIG. 1, the communication system 236 of FIG. 2, or combinations thereof. The comparison of the motion threshold data 510 with motion data 520 may be performed via the pairing system 130 and/or the pairing system 170 of FIG. 1, the proximity determination system 234 of FIG. 2, or combinations thereof. Generation of the key may be implemented in the key generator 140 and/or the key generator 180 of FIG. 1, the key generator 240 of FIG. 2, or combinations thereof. The comparison of keys may be implemented in the pairing system 130 and/or the pairing system 170 of FIG. 1, the key comparison module 232 of FIG. 2, or combinations thereof. The method 500 may further include generating a key based on anomaly data responsive to the motion data matching the motion threshold data. In some examples, generating the key may include retrieving anomaly data from motion information captured at device A. The generated key may be based on the anomaly data. In some examples, retrieving anomaly data from motion information may include identifying (e.g., and tagging) samples of the motion information that exceed a threshold. In some examples, the method 500 may further include receiving a received key from device B, and comparing the received key with the generated key. In some examples, the method 500 may further include pairing device A with device B responsive to the generated key matching the received key.

Figure 6:
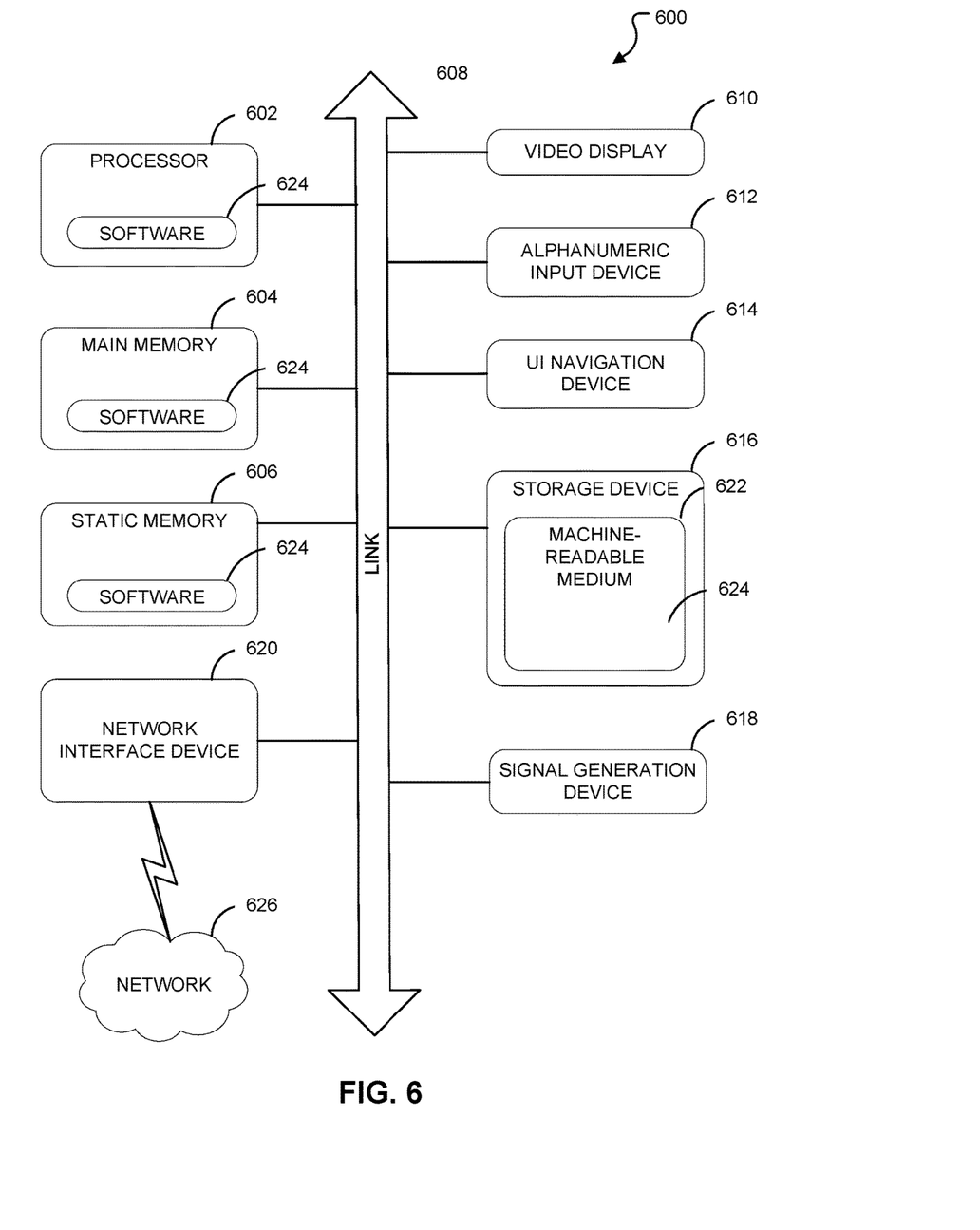
FIG. 6 illustrates a block diagram illustrating a machine in the example form of a computer system in accordance with some embodiments.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor unit 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor unit 602 during execution thereof by the computer system 600, with the main memory 604, static memory 606, and the processor unit 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various illustrative components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

Additional Notes & Examples

Example 1 is a host device to pair with a modular device, the host device comprising: an environmental data collection system to provide motion data; a data analysis circuit to filter the motion data to provide motion information, the data analysis circuit further to detect anomalies in the motion data to provide anomaly data; a pairing system to determine whether the host device is proximate to the modulate device based on a comparison of the motion information with received motion information from the modular device, wherein the pairing circuit is further to pair with the modular device responsive to a match between a key and a received key from the modular device; and a key generator to generate the key based on a comparison between the anomaly data and received anomaly data from the modular device responsive to a determination that the modular device is proximate.

In Example 2, the subject matter of Example 1 optionally includes wherein the environmental collection system includes an accelerometer to collect motion data.

In Example 3, the subject matter of any one or more of Examples 1-2 optionally include wherein the environmental collection system further includes a global positioning receiver (GPS) to receive location data, wherein determination of whether the modular device is proximate is further based the location data.

In Example 4, the subject matter of any one or more of Examples 1-3 optionally include wherein the data analysis circuit comprises a motion data filter that filters the motion data to remove anomalies from the motion data to provide the motion information.

In Example 5, the subject matter of any one or more of Examples 1-4 optionally include wherein the data analysis circuit comprises a motion data anomaly detector configured to detect anomalies in the motion data to provide the anomaly data.

In Example 6, the subject matter of any one or more of Examples 1-5 optionally include wherein the pairing system comprises a communication system, wherein the communication system includes a transceiver to provide the motion information and anomaly data to the modular device, where the transceiver further to the receive the received motion information and the received anomaly data received from the modular device.

In Example 7, the subject matter of any one or more of Examples 1-6 optionally include wherein the pairing system comprises a key comparison module to compare the key with the received key.

In Example 8, the subject matter of Example 7 optionally includes wherein the key comparison module detects a match when the key matches the received key exactly.

In Example 9, the subject matter of any one or more of Examples 7-8 optionally include wherein the key comparison module detects a match when a threshold count of data points match between the key matches and the received key.

In Example 10, the subject matter of any one or more of Examples 1-9 optionally include wherein the pairing system comprises a proximity determination system that determines proximity with the modular device based on a comparison of the motion information with the received motion information from the modular device.

In Example 11, the subject matter of Example 10 optionally includes wherein the proximity determination system compares the motion information with the received motion information from the modular device to detect a matching pattern.

In Example 12, the subject matter of Example 11 optionally includes wherein the matching pattern is one of similar motion or reciprocal motion.

In Example 13, the subject matter of any one or more of Examples 1-12 optionally include wherein the pairing circuit further to block reception of communication the modular device responsive to failure to find a match between the key and the received key from the modular device.

In Example 14, the subject matter of any one or more of Examples 1-13 optionally include wherein the pairing circuit further to block reception of communication from the modular device responsive to failure to detect that the modular device is proximate based on a comparison between the motion information and the received motion information from the modular device.

In Example 15, the subject matter of any one or more of Examples 1-14 optionally include wherein the environmental collection system further includes temperature sensor to collect temperature data, wherein the pairing system to determine whether the host device is proximate to the modulate device is further based on a comparison of the temperature data with received temperature data from the modular device.

In Example 16, the subject matter of any one or more of Examples 1-15 optionally include wherein the environmental collection system further includes an audio sensor to collect audio data, wherein the pairing system to determine whether the host device is proximate to the modulate device is further based on a comparison of the audio data with received audio data from the modular device.

Example 17 is a method to pair a host device with a modular device comprising: collecting motion data at the host device; filtering the motion data to provide motion information; detecting anomalies in the motion data to provide anomaly data; determining whether the host device is proximate to the modular device based on a comparison between the motion information and received motion information from the modular device; and pairing with the modular device responsive to a match between a key and a received key from the modular device, wherein the key is generated based on the anomaly data.

In Example 18, the subject matter of Example 17 optionally includes generating the key based on a comparison between the anomaly data and received anomaly data from the modular device responsive to a determination that the modular device is proximate.

In Example 19, the subject matter of any one or more of Examples 17-18 optionally include collecting location data, wherein determination of whether the modular device is proximate is further based the location data.

In Example 20, the subject matter of any one or more of Examples 17-19 optionally include wherein filtering the motion data to provide motion information comprises removing anomalies from the motion data.

In Example 21, the subject matter of any one or more of Examples 17-20 optionally include providing the motion information and anomaly data to the modular device; and receiving the received motion information and the received anomaly data from the modular device.

In Example 22, the subject matter of any one or more of Examples 17-21 optionally include comparing the key with the received key.

In Example 23, the subject matter of Example 22 optionally includes detecting a match when the key matches the received key exactly.

In Example 24, the subject matter of any one or more of Examples 22-23 optionally include detecting a match when a threshold count of data points match between the key matches and the received key.

In Example 25, the subject matter of any one or more of Examples 17-24 optionally include comparing the motion information with the received motion information from the modular device to detect a matching pattern.

In Example 26, the subject matter of Example 25 optionally includes wherein the matching pattern is one of similar motion or reciprocal motion.

In Example 27, the subject matter of any one or more of Examples 17-26 optionally include blocking reception of communication the modular device responsive to failure to find a match between the key and the received key from the modular device.

In Example 28, the subject matter of any one or more of Examples 17-27 optionally include blocking reception of communication the modular device responsive to failure to detect that the modular device is proximate based on a comparison between the motion information and the received motion information from the modular device.

In Example 29, the subject matter of any one or more of Examples 17-28 optionally include collecting temperature data; and determining whether the host device is proximate the modulate device further based on a comparison of the temperature data with received temperature data from the modular device.

In Example 30, the subject matter of any one or more of Examples 17-29 optionally include collecting audio data; and determining whether the host device is proximate the modulate device further based on a comparison of the audio data with received audio data from the modular device.

Example 31 is at least one medium including instructions that, when executed on a machine cause the machine to perform any of the methods of Examples 17-30.

Example 32 is an apparatus comprising means for performing any of the methods of Examples 17-30.

Example 33 is a method to pair a host device with a modular device comprising: generating motion threshold data from motion information at the host device, receiving motion data from the modular device; comparing the motion threshold data to the motion data; generating a generated key based on anomaly data responsive to the motion data matching the motion threshold data.

In Example 34, the subject matter of Example 33 optionally includes receiving a received key from the modular device; and comparing the received key with the generated key.

In Example 35, the subject matter of Example 34 optionally includes pairing the host device with the modular device responsive to the generated key matching the received key.

In Example 36, the subject matter of any one or more of Examples 33-35 optionally include wherein generating a generated key based on anomaly data responsive to the motion data matching the motion threshold data comprises retrieving anomaly data from motion information, wherein the generated key is based on the anomaly data.

In Example 37, the subject matter of any one or more of Examples 33-36 optionally include wherein retrieving anomaly data from motion information comprises identifying samples of the motion information that exceed a threshold.

Example 38 is at least one medium including instructions that, when executed on a machine cause the machine to perform any of the methods of Examples 33-37.

Example 39 is an apparatus comprising means for performing any of the methods of Examples 33-37.

Example 40 is a host device to pair with a modular device, the host device comprising: means for collecting motion data at the host device; means for filtering the motion data to provide motion information; means for detecting anomalies in the motion data to provide anomaly data; means for determining whether the host device is proximate to the modular device based on a comparison between the motion information and received motion information from the modular device; and means for pairing with the modular device responsive to a match between a key and a received key from the modular device, wherein the key is generated based on the anomaly data.

In Example 41, the subject matter of Example 40 optionally includes means for generating the key based on a comparison between the anomaly data and received anomaly data from the modular device responsive to a determination that the modular device is proximate.

In Example 42, the subject matter of any one or more of Examples 40-41 optionally include means for collecting location data, wherein determination of whether the modular device is proximate is further based the location data.

In Example 43, the subject matter of any one or more of Examples 40-42 optionally include wherein the means for filtering the motion data to provide motion information comprises means for removing anomalies from the motion data.

In Example 44, the subject matter of any one or more of Examples 40-43 optionally include means for providing the motion information and anomaly data to the modular device; and means for receiving the received motion information and the received anomaly data from the modular device.

In Example 45, the subject matter of any one or more of Examples 40-44 optionally include means for comparing the key with the received key.

In Example 46, the subject matter of Example 45 optionally includes means for detecting a match when the key matches the received key exactly.

In Example 47, the subject matter of any one or more of Examples 45-46 optionally include means for detecting a match when a threshold count of data points match between the key matches and the received key.

In Example 48, the subject matter of any one or more of Examples 40-47 optionally include means for comparing the motion information with the received motion information from the modular device to detect a matching pattern.

In Example 49, the subject matter of Example 48 optionally includes wherein the means for matching pattern is one of similar motion or reciprocal motion.

In Example 50, the subject matter of any one or more of Examples 40-49 optionally include means for blocking reception of communication the modular device responsive to failure to find a match between the key and the received key from the modular device.

In Example 51, the subject matter of any one or more of Examples 40-50 optionally include means for blocking reception of communication the modular device responsive to failure to detect that the modular device is proximate based on a comparison between the motion information and the received motion information from the modular device.

In Example 52, the subject matter of any one or more of Examples 40-51 optionally include means for collecting temperature data; and means for determining whether the host device is proximate the modulate device further based on a comparison of the temperature data with received temperature data from the modular device.

In Example 53, the subject matter of any one or more of Examples 40-52 optionally include means for collecting audio data; and means for determining whether the host device is proximate the modulate device further based on a comparison of the audio data with received audio data from the modular device.

Example 54 is a host device to pair with a modular device, the host device comprising: means for generating motion threshold data from motion information at the host device, means for receiving motion data from the modular device; means for comparing the motion threshold data to the motion data; means for generating a generated key based on anomaly data responsive to the motion data matching the motion threshold data.

In Example 55, the subject matter of Example 54 optionally includes means for receiving a received key from the modular device; and means for comparing the received key with the generated key.

In Example 56, the subject matter of Example 55 optionally includes means for pairing the host device with the modular device responsive to the generated key matching the received key.

In Example 57, the subject matter of any one or more of Examples 54-56 optionally include wherein means for generating a generated key based on anomaly data responsive to the motion data matching the motion threshold data comprises means for retrieving anomaly data from motion information, wherein the generated key is based on the anomaly data.

In Example 58, the subject matter of any one or more of Examples 54-57 optionally include wherein means for retrieving anomaly data from motion information comprises means for identifying samples of the motion information that exceed a threshold.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A host device to pair with a modular device, the host device comprising:
   an environmental data collection system to provide motion data;
   a data analysis circuit to filter the motion data to provide motion information, the data analysis circuit further to detect anomalies in the motion data to provide anomaly data;
   a pairing circuit to determine whether the host device is proximate to the modular device based on a comparison of the motion information with received motion information from the modular device, the pairing circuit further to pair with the modular device responsive to a match between a key and a received key from the modular device, and the pairing circuit to block reception of communication from the modular device responsive to a failure to find a match between the key and the received key from the modular device; and
   a key generator to generate the key based on a comparison between the anomaly data and received anomaly data from the modular device responsive to a determination that the modular device is proximate.

2. The host device of claim 1, wherein the environmental collection system includes an accelerometer to collect motion data.

3. The host device of claim 1, wherein the environmental collection system further includes a global positioning receiver (GPS) to receive location data, wherein determination of whether the modular device is proximate is further based the location data.

4. The host device of claim 1, wherein the data analysis circuit comprises a motion data filter that filters the motion data to remove anomalies from the motion data to provide the motion information.

5. The host device of claim 1, wherein the data analysis circuit comprises a motion data anomaly detector configured to detect anomalies in the motion data to provide the anomaly data.

6. The host device of claim 1, wherein the pairing system comprises a communication system, wherein the communication system includes a transceiver to provide the motion information and anomaly data to the modular device, where the transceiver further to the receive the received motion information and the received anomaly data received from the modular device.

7. The host device of claim 1, wherein the pairing system comprises a key comparison module to compare the key with the received key.

8. The host device of claim 7, wherein the key comparison module detects a match when a threshold count of data points match between the key matches and the received key.

9. The host device of claim 1, wherein the pairing system comprises a proximity determination system that determines proximity with the modular device based on a comparison of the motion information with the received motion information from the modular device.

10. The host device of claim 9, wherein the proximity determination system compares the motion information with the received motion information from the modular device to detect a matching pattern.

11. The host device of claim 1, wherein the pairing circuit further to block reception of communication from the modular device responsive to a failure to detect that the modular device is proximate based on a comparison between the motion information and the received motion information from the modular device.

12. At least one non-transitory machine-readable medium storing instructions that, when executed on a machine cause the machine to perform operations including:
   collecting motion data at the host device;
   filtering the motion data to provide motion information;
   detecting anomalies in the motion data to provide anomaly data;
   determining whether the host device is proximate to the modular device based on a comparison between the motion information and received motion information from the modular device;
   pairing with the modular device responsive to a match between a key and a received key from the modular device, wherein the key is generated based on the anomaly data; and
   blocking reception of communication from the modular device responsive to a failure to find a match between the key and the received key from the modular device.

13. The non-transitory machine-readable medium of claim 12, further storing instructions that, when executed on the machine, cause the machine to perform operations including generating the key based on a comparison between the anomaly data and received anomaly data from the modular device responsive to a determination that the modular device is proximate.

14. The non-transitory machine-readable medium of claim 12, wherein filtering the motion data to provide motion information includes instructions that, when executed on the machine, cause the machine to perform operations including removing anomalies from the motion data.

15. The non-transitory machine-readable medium of claim 12, further storing instructions that, when executed on the machine, cause the machine to perform operations including:
   providing the motion information and anomaly data to the modular device; and
   receiving the received motion information and the received anomaly data from the modular device.

16. The non-transitory machine-readable medium of claim 12, further storing instructions that, when executed on the machine, cause the machine to perform operations including comparing the key with the received key.

17. The non-transitory machine-readable medium of claim 16, further storing instructions that, when executed on the machine, cause the machine to perform operations including detecting a match when a threshold count of data points match between the key matches and the received key.

18. The non-transitory machine-readable medium of claim 12, further storing instructions that, when executed on the machine, cause the machine to perform operations including comparing the motion information with the received motion information from the modular device to detect a matching pattern.

19. A method to pair a host device with a modular device comprising:

generating motion threshold data from motion information at the host device;
receiving motion data from the modular device;
comparing the motion threshold data to the motion data;
receiving a received key from the modular device;
comparing the received key with the generated key;
blocking reception of communication from the modular device responsive to a failure to find a match between the key and the received key from the modular device; and
generating a generated key based on anomaly data responsive to the motion data matching the motion threshold data.

20. The method of claim 19, further comprising pairing the host device with the modular device responsive to the generated key matching the received key.

21. The method of claim 19, wherein generating a generated key based on anomaly data responsive to the motion data matching the motion threshold data comprises retrieving anomaly data from motion information, wherein the generated key is based on the anomaly data.

22. The method of claim 19, wherein retrieving anomaly data from motion information comprises identifying samples of the motion information that exceed a threshold.

* * * * *